United States Patent [19]

Hedrick, Jr. et al.

[11] Patent Number: 5,045,608
[45] Date of Patent: Sep. 3, 1991

[54] POLYIMIDE-POLY(PHENYLQUINOXA-LINE) BLOCK COPOLYMERS

[75] Inventors: James L. Hedrick, Jr., Santa Clara; Donald C. Hofer, San Martin; Jeffrey W. Labadie, Campbell; Sally A. Swanson; Willi Volksen, both of San Jose, all of Calif.

[73] Assignee: IBM Corporation, Armonk, N.Y.

[21] Appl. No.: 413,361

[22] Filed: Sep. 27, 1989

[51] Int. Cl.$^5$ .............................................. C08L 77/06
[52] U.S. Cl. ..................................... 525/436; 525/434
[58] Field of Search ................................. 525/534, 436

[56] References Cited

U.S. PATENT DOCUMENTS 3,943,107  3/1976  Seltzer et al. ........................ 260/65

OTHER PUBLICATIONS

"Synthesis of Polyphenylquinoxalines Via Armatic Nucleophilic Displacement", Connell, J. W., Hergenrother, P. M., 1988, Virginia, Commonw. Univ. Richmond.

*Primary Examiner*—John C. Bleutge
*Assistant Examiner*—David E. Aylward
*Attorney, Agent, or Firm*—Joseph G. Walsh

[57] ABSTRACT

Block copolymers of polyimide and poly (phenylquinoxaline) have been synthesized. They are useful, particularly as dielectric layers in thin film multilayer structures. The most preferred embodiments are formed from polyimides which are those from pyromellitic dianhydride and oxydianiline. The most preferred poly (phenylquinoxaline) is a monofunctional oligomer, which yields the best microstructure.

4 Claims, 2 Drawing Sheets

POLYIMIDE-POLY(PHENYLQUINOXALINE) BLOCK COPOLYMERS

TECHNICAL FIELD

The present invention is concerned with polyimide-poly(phenylquinoxaline) block copolymers. The block copolymers are useful as packaging materials, particularly as insulator layers in thin film wiring structures on ceramic modules.

BACKGROUND ART

Currently used packaging materials for thin film wiring structures fail to meet three major requirements:
(1) Adhesion (glass ceramic and self-adhesion to fully cured polymer)
(2) Low stress (low thermal expansion coefficient (TEC) or relaxation mechanism) and
(3) Low swell when in contact with N-methylpyrollidone (NMP).

The poor adhesion observed for many polyimides is often circumvented with adhesion promoters and reactive ion etching (RIE) surface treatments, but the reliability of this approach is suspect in temperature and humidity testing and can lead to corrosion. A film which is low stress and does not swell is desired to avoid cracking, delamination, etc. of the polymer films during fabrication. Biphenyl dianhydride-phenylene diamine (BPDA-PDA) is the best commercially available polyamic acid to meet these requirements, but the adhesion characteristics of this material are poor. Alternatively, Poly(phenylquinoxalines), PPQ, show excellent adhesion characteristics to a wide variety of substrates but these materials cannot be processed from N-methyl-pyrollidone (NMP) and have a high TEC.

Ideally a hybrid material (copolymer) can be developed which displays excellent adhesion and low NMP swell like PPQ's, the processing characteristics of polyamic esters, and the final properties of rigid or semi-rigid polyimides after cure. There are a number of reports concerning polyimide-phenylquinoxaline based random copolymers, but these materials must be processed from m-cresol. There are no reports of polyimidephenylquinoxaline block copolymers primarily due to the lack of a common solvent system for polyamic acids and PPQs to allow copolymerization, and the difficulty encountered in performing block copolymerizations with polyamic acids of rigid and semi-rigid polyimides.

Chemical Abstracts 109:55338r shows the synthesis of polyphenylquinoxalines via aromatic nucleophilic displacement, but it is not concerned with the block copolymers of the present invention.

DISCLOSURE OF THE INVENTION

Our invention is a new class of materials, polyimide-phenylquinoxaline block copolymers which have the requisite properties to perform as dielectric layers in thin film multilayer structures. A key component of this invention is the ability to synthesize NMP soluble amine terminated PPQ oligomers, which are compatible with polyamic ester synthesis. The synthesis of the PPQ oligomers is carried out using quinoxaline-activated fluoro displacement with bisphenates as the polymer forming reaction. The resulting PPQ's have arylene ether linkages in the polymer backbone which leads to the improved solubility in NMP. The amine functional groups are introduced by using aminophenol as a capping agent and the molecular weight can be controlled by using the Caruthers equation, with both mono and difunctional oligomers possible. Another important feature of the copolymerization is the use of polyamic ester chemistry which allows isolation and purification of the final copolymer, which can be reformulated in the desired processing solvent (or solvent mixture). The copolymer synthesis involves treatment of a solution of the PPQ oligomer and the diamine in NMP/CHP (N-cyclohexylpyrollidone) with the diester diaeyl chloride. This synthetic scheme was used to prepare both multiblock and triblock copolymers from di- and monofunctional PPQ oligomers, respectively. We have synthesized several series of copolymer using oxydianiline and the diethyl ester diacyl chloride of PMDA with different PPQ oligomers.

An understanding of the invention will be facilitated by reference to the accompanying drawings.

Figure 1:
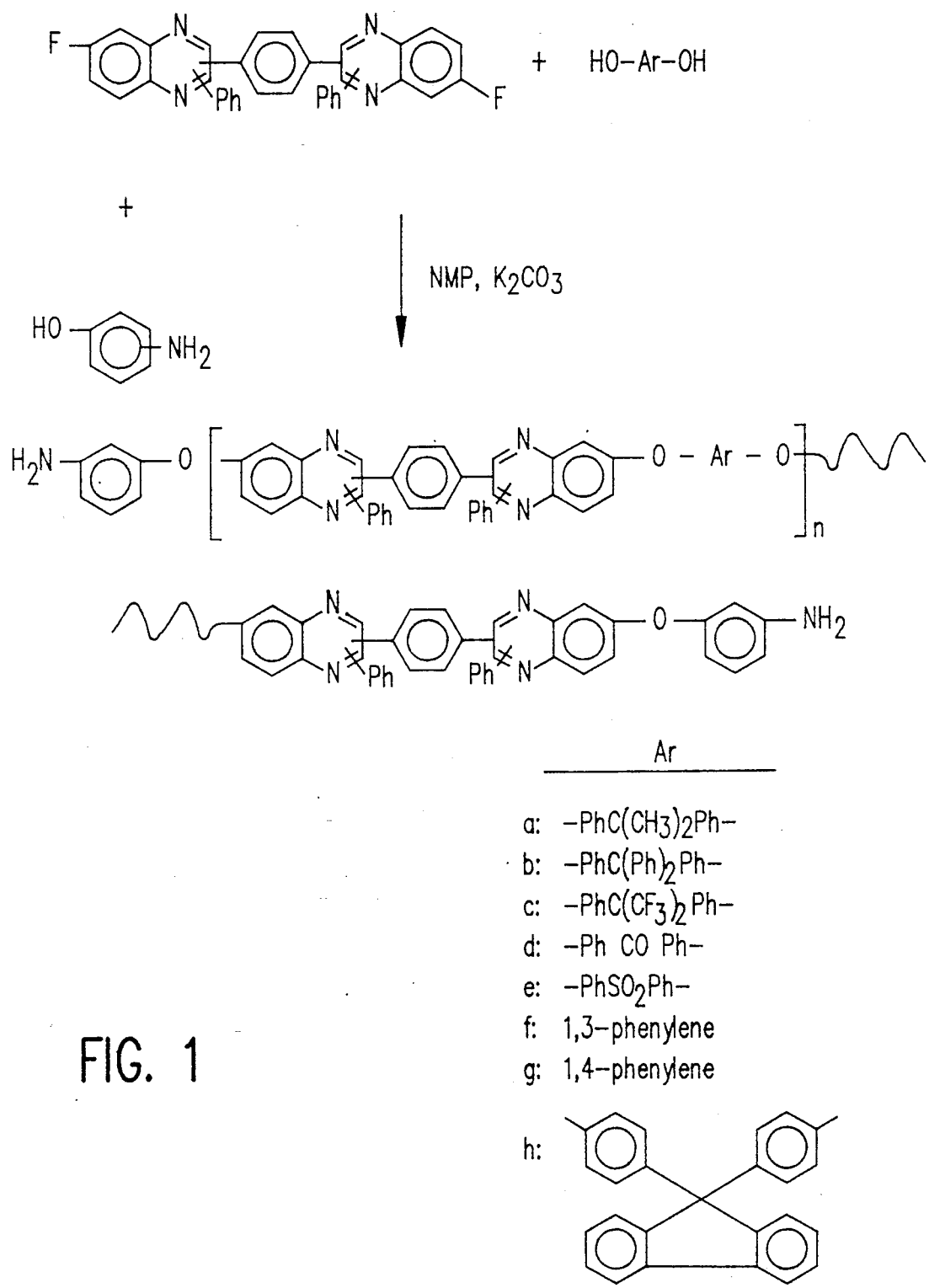
FIG. 1 is a diagrammatic sketch using structural formulas showing the synthesis of poly (phenylquinoxaline) PPQ oligomers. In the synthesis quinoxaline-activated fluoro displacement with bisphenates is the polymer forming reaction.
Figure 2:
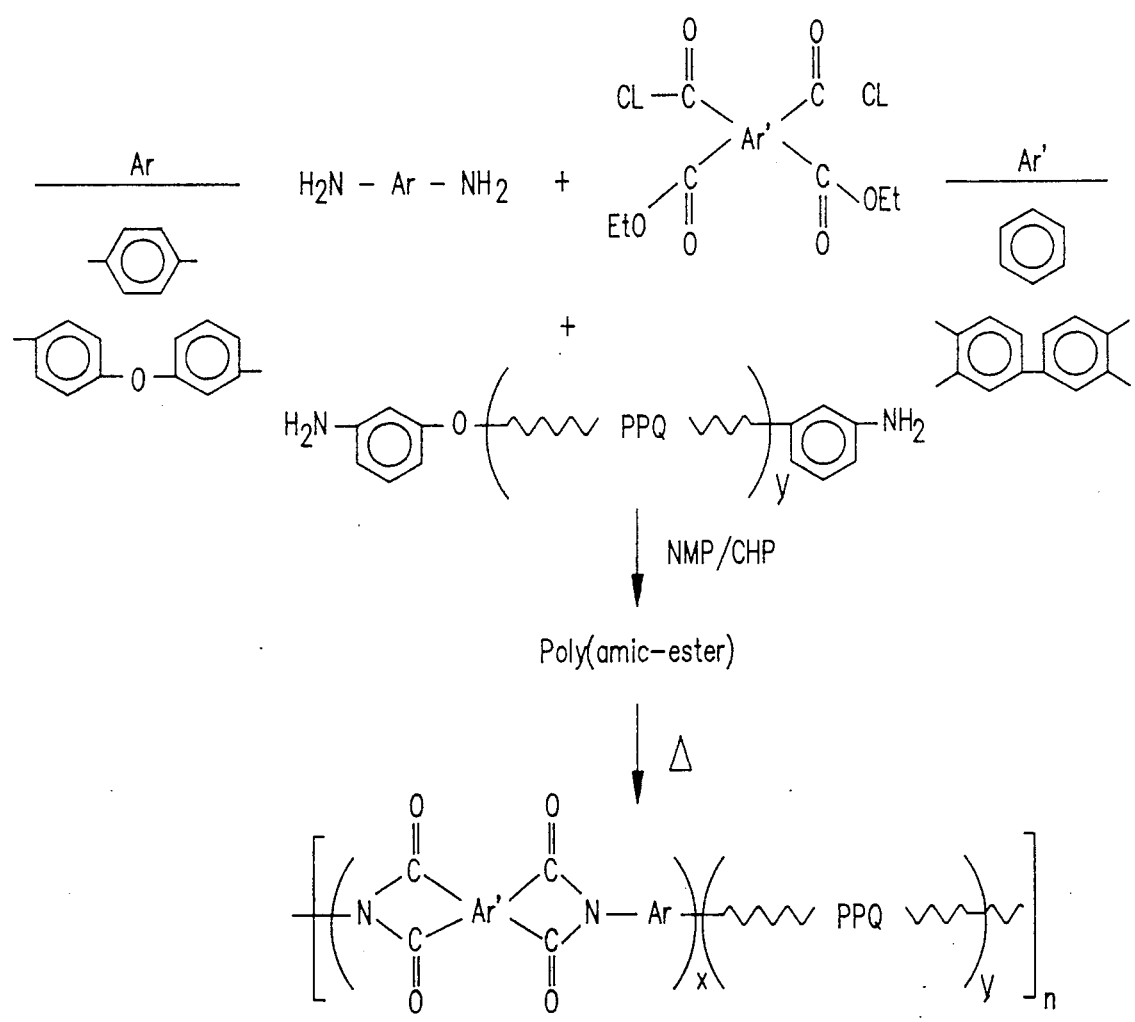
FIG. 2 is a diagrammatic sketch using structural formulas showing the copolymer synthesis. The synthesis involves treatment of a solution of the PPQ oligomer (formed in FIG. 1) and a diamine in NMP/CHP with diester diaeyl chloride.

The thermal and mechanical properties of the copolymers were excellent. Dynamic TGA and isothermal TGA at 400° C. showed the copolymers to have thermal stability comparable to polyimide homopolymers. Dynamic mechanical analysis showed a Tg corresponding to the PPQ block at 250° C., consistent with PPQ microdomains. The materials showed dimensional stability (retention of modulus) to 450° C., analogous to the polyimide homopolymer, with the modulus of the material only dropping approximately one decade above 250° C. The copolymer displayed tough ductile mechanical properties with moduli in the 2300 MPa range and elongations of approximately 100%. In addition the TECs of the copolymer were about half that of the parent polyimide ranging from 15-22 ppm (thick films).

Peel Test experiments were carried out to determine the adhesion of two polymer layers, where the first layer was cured to a specific cure temperature ($T_1$), then the second layer was solution applied and cured at $T_2$. It has been shown that the self adhesion of PMDA-ODA is dependent on the cure temperatures used for each layer. The PMDA-ODA control sample (DuPont PI-2540 polyamic acid) showed generally poor self adhesion, particularly when the first layer is fully cured, i.e. $T_1 = 400°$ C. (Table 1) When the same adhesion test was applied with polyimide-PPQ multiblock and triblock copolymers excellent self-adhesion was observed, even when $T_1$ was 400° C. (Tables 2 and 3) In most cases the films laminated (only one distinguishable layer) and the films could not be peeled. A PPQ composition on the order of 15% appears to be all that is required to obtain dramatically improved adhesion. A further extension of this is to use polyimide-PPQ triblock copolymers blended with PPQ homopolymer (Table 4). Initial results show these materials show good adhesion to glass ceramic substrates without the use of adhesion promoter.

The polyimide-PPQ copolymers showed excellent resistance to NMP swell. Data obtained for both multi-block and triblock copolymers show the swelling in an NMP/CHP mixture to be less than 2%.

In summary, the incorporation of the PPQ into PMDA-ODA via a block copolymer approach affords new hybrid polymers which display the requisite adhesion and low NMP swell required for TFM structures without compromising the desirable properties of the polyimide. The TECs were lower than PMDA-ODA.

In the most preferred embodiments of the present invention, monofunctional oligomers of PPQ are used to give the best microstructure. The most preferred polyimides are those from pyromellitic dianhydride and oxydianiline and from biphenyl dianhydride and phenylenediamine.

TABLE 1

PMDA-ODA PI 2540

| $T_1$ (°C.) | $T_2$ (°C.) | Peel strength (g/mm) |
|---|---|---|
| 200 | 300 | 15 |
| 200 | 350 | 10 |
| 200 | 400 | 10 |
| 250 | 350 | 9 |
| 250 | 400 | 9 |
| 300 | 300 | 2 |
| 300 | 350 | 5 |
| 400 | 400 | 0.72 |

TABLE 2

PI/PPQ Block Copolymers

| Block length | Wt. % PPQ | $T_1$ (°C.) | $T_2$ (°C.) | Peel strength (g/mm) |
|---|---|---|---|---|
| 6.2K | 8 | 200 | 400 | laminate |
| 6.2K | 8 | 400 | 400 | 57 |
| 6.2K | 25 | 400 | 400 | 61 |
| 6.2K | 50 | 400 | 400 | laminate |

TABLE 2-continued

PI/PPQ Block Copolymers

| Block length | Wt. % PPQ | $T_1$ (°C.) | $T_2$ (°C.) | Peel strength (g/mm) |
|---|---|---|---|---|
| 15.5K | 13 | 200 | 400 | laminate |
| 15.5K | 13 | 400 | 400 | laminate |
| 15.5K | 25 | 400 | 400 | laminate |
| 15.5K | 50 | 400 | 400 | laminate |
| 23K | 15 | 200 | 400 | laminate |
| 23K | 15 | 400 | 400 | laminate |

TABLE 3

PI/PPQ (6.0K) Triblock

| Wt. % PPQ | $T_1$ (°C.) | $T_2$ (°C.) | Peel strength (g/mm) |
|---|---|---|---|
| 25 | 200 | 400 | laminate |
| 25 | 400 | 400 | laminate |
| 50 | 200 | 400 | laminate |
| 50 | 400 | 400 | laminate |

TABLE 4

PI/PPQ Block Copolymers Blends

| Block length | Wt. % PPQ | $T_1$ (°C.) | $T_2$ (°C.) | Peel strength (g/mm) |
|---|---|---|---|---|
| 6.2K | 13 | 400 | 400 | 56 |
| 6.2K | 13 Blend R = .2 | 400 | 400 | 25 |
| 6.2K | 13 Blend R = .5 | 400 | 400 | 11 |
| 15.5K | 13 | 400 | 400 | laminate |
| 15.5K | 13 Blend R = .2 | 400 | 400 | laminate |
| 15.5K | 13 Blend R = .5 | 400 | 400 | laminate |

What is claimed is:

1. A block copolymer of polyimide and poly (phenylquinoxaline).

2. A block copolymer as claimed in claim 1 wherein the polyimide portion is from pyromellitic dianhydride and oxydianiline.

3. A block copolymer as claimed in claim 1 wherein the polyimide portion is from biphenyl dianhydride and phenylenediamine.

4. A block copolymer as claimed in claim 1 wherein the block copolymer is formed from a monofunctional oligomer of poly (phenylquinoxaline).

* * * * *